(12) United States Patent
Flotte et al.

(10) Patent No.: US 10,358,231 B2
(45) Date of Patent: Jul. 23, 2019

(54) METHOD AND SYSTEM FOR PILOT DECISION AID FOR THE AIRCRAFT PILOTING AND ASSOCIATED COMPUTER PROGRAM PRODUCT

(71) Applicant: THALES, Courbevoie (FR)

(72) Inventors: Laurent Flotte, Toulouse (FR); Chris Deseure, Toulouse (FR); Guillaume Urbanski, Le Haillan (FR)

(73) Assignee: THALES, Courbevoie (FR)

( * ) Notice: Subject to any disclaimer, the term of this patent is extended or adjusted under 35 U.S.C. 154(b) by 255 days.

(21) Appl. No.: 15/344,676

(22) Filed: Nov. 7, 2016

(65) Prior Publication Data
US 2017/0129621 A1    May 11, 2017

(30) Foreign Application Priority Data

Nov. 9, 2015 (FR) ...................... 15 02350

(51) Int. Cl.
| | | |
|---|---|---|
| *B64D 45/00* | (2006.01) | |
| *B64D 15/20* | (2006.01) | |
| *B64D 43/00* | (2006.01) | |
| *G08G 5/00* | (2006.01) | |
| *G05B 23/02* | (2006.01) | |

(52) U.S. Cl.
CPC ............ *B64D 45/00* (2013.01); *B64D 15/20* (2013.01); *B64D 43/00* (2013.01); *G05B 23/0272* (2013.01); *G08G 5/0004* (2013.01); *G08G 5/0047* (2013.01); *G08G 5/0091* (2013.01); *B64D 2045/0085* (2013.01); *G05B 2219/45071* (2013.01)

(58) Field of Classification Search
CPC ........ B64D 15/20; B64D 43/00; B64D 45/00; B64D 2045/0085; G05B 23/027; G05B 2219/45071; G08G 5/0004; G08G 5/0047; G08G 5/0091
See application file for complete search history.

(56) References Cited

U.S. PATENT DOCUMENTS

| | | |
|---|---|---|
| 2010/0049379 A1 | 2/2010 | Vial |
| 2010/0161157 A1 | 6/2010 | Guilley et al. |
| | (Continued) | |

FOREIGN PATENT DOCUMENTS

EP     2 860 601 A1     4/2015

OTHER PUBLICATIONS

FR Search Report, dated May 17, 2016, from corresponding FR application.

*Primary Examiner* — Robert T Nguyen
(74) *Attorney, Agent, or Firm* — Young & Thompson

(57) ABSTRACT

This decision aid method includes the following steps:
acquiring (110) operating states of systems, the operating states being determined by a monitoring system;
determining (120) an availability state of each operational capacity, based on the operating states of only the systems of the aircraft implementing that operational capacity, each availability state being chosen from among the group consisting of: a normal state, a downgraded state, an impacted state and a lost state;
selecting (150) one or more operational capacities based on the current movement context of the aircraft;
communicating (150) the availability state of each selected operational capacity to the pilot.

15 Claims, 7 Drawing Sheets

(56) References Cited

U.S. PATENT DOCUMENTS

| | | | | |
|---|---|---|---|---|
| 2010/0204855 A1* | 8/2010 | Vial | ............... | G01C 23/005 |
| | | | | 701/14 |
| 2013/0282206 A1* | 10/2013 | Guilley | ............... | B64D 45/00 |
| | | | | 701/3 |
| 2015/0217856 A1* | 8/2015 | Mesguen | ............... | B64C 19/00 |
| | | | | 701/3 |
| 2015/0217857 A1* | 8/2015 | Mesguen | ............... | B64C 19/00 |
| | | | | 701/3 |
| 2015/0217874 A1* | 8/2015 | Mesguen | ............... | B64D 43/00 |
| | | | | 701/29.1 |
| 2015/0344149 A1* | 12/2015 | Mumaw | ............... | G05B 23/0251 |
| | | | | 701/33.4 |
| 2017/0148236 A1* | 5/2017 | Sannino | ............... | G05B 23/0278 |
| 2017/0183085 A1* | 6/2017 | Branthomme | ............... | F02C 9/26 |

\* cited by examiner

METHOD AND SYSTEM FOR PILOT DECISION AID FOR THE AIRCRAFT PILOTING AND ASSOCIATED COMPUTER PROGRAM PRODUCT

FIELD OF THE INVENTION

The present invention relates to a method for pilot decision aid for the aircraft piloting and associated computer program product.

The present invention also relates to a system for pilot decision aid for the aircraft piloting.

"Aircraft" refers to a moving vehicle piloted by at least one pilot, and in particular able to fly in the Earth's atmosphere, such as an airplane, helicopter or drone.

The aircraft includes a plurality of systems that can be used by the pilot to operate the aircraft. "System" refers to a device that is at least partially electronic or a combination of such devices, onboard the aircraft and able to carry out one or several services making it possible to operate the aircraft.

The invention more particularly makes it possible to help the pilot handle abnormal situations caused by a malfunction of one or several systems during the operation of the aircraft.

BACKGROUND OF THE INVENTION

Among the set of systems of an aircraft, there is generally at least one monitoring system making it possible to monitor the operation of the other systems and to detect any malfunction thereof.

When no malfunction of the monitored system is detected, the monitoring system assigns that system the normal operating state.

When a malfunction of the monitored system is detected, the monitoring system assigns that system the faulty operating state.

In the latter case, the monitoring system can notify the pilot of the detected malfunction in particular by generating a corresponding alert. Certain monitoring systems further make it possible to the pilot a predetermined procedure for reconfiguring one or several systems to offset this malfunction and return it to a "safe" situation in terms of flight safety.

This is in particular the case for a monitoring system known as "Flight Warning System (FWS), which is onboard most current aircraft.

Systems of the FWS type in particular make it possible to monitor the majority of the systems of the aircraft.

With the increased complexity of systems, the number of the functions that may appear simultaneously in the systems is growing considerably. Furthermore, a malfunction in a given system may cause multiple malfunctions in systems depending on it.

Information regarding the malfunction of one or more systems may next be processed appropriately as for example proposed in EP 2,860,601 A1. In particular, this document proposes analyzing the influence of such a malfunction on the capacities or operational tasks of the aircraft.

In general, the monitoring systems of the FWS type are faced with the need to manage the communication of multiple alerts to the pilot.

There are currently alert priority mechanisms implemented in monitoring systems of the FWS type. These mechanisms in particular make it possible to assign a priority to each of the alerts and to communicate these alerts to the pilot based on their priority.

However, the management of the communication of these alerts to the pilot by the monitoring systems of the FWS type is not completely satisfactory. In particular, when a large number, for example tens, of malfunctions occur simultaneously, the existing priority mechanisms do not make it possible to process the corresponding alerts efficiently. Thus, these alerts are communicated to the pilot practically simultaneously, which does not allow the pilot to process them in a satisfactory manner to guarantee the safety of the flight.

SUMMARY OF THE INVENTION

The present invention aims to propose a method for pilot decision aid allowing the pilot to handle abnormal situations caused by malfunctions occurring in one or more systems, efficiently. This then makes it possible to reduce the workload inherent to managing the systems, as well as the pilot's stress.

To that end, the invention relates to a method for pilot decision aid for piloting an aircraft, the aircraft including a set of systems implementing operational capacities of the aircraft, each system being associated with a plurality of operating parameters defining its behavior, at least one system, called monitoring system, making it possible to determine operating state of each other system;

the aircraft moving in different movement contexts and being piloted using operational capacities selected by the pilot based on a current movement context of the aircraft;

each current movement context being defined by the systems used at the current moment to pilot the aircraft, by their operating parameters and by conditions outside the aircraft;

the method including the following steps:

acquiring operating states of systems other than the monitoring system, the operating states being determined by the monitoring system, each operating state being chosen from among a normal state and a faulty state;

determining an availability state of each operational capacity, based on the operating states of only the systems of the aircraft implementing that operational capacity, each availability state being chosen from among the group consisting of: a normal state, a downgraded state, an impacted state and a lost state;

selecting one or more operational capacities based on the current movement context of the aircraft;

communicating the availability state of each selected operational capacity to the pilot.

In particular, unlike the solution proposed in EP 2,860,601 A1, the invention in particular makes it possible to communicate information to the pilot regarding not only the downgrade or loss of an operational capacity of the aircraft, but also information regarding available operational capacities. This then allows the pilot to reconfigure the aircraft in the case of abnormal situations to use the available operational capacities.

Furthermore, the information is communicated based on the movement context of the aircraft, which allows the pilot to effectively handle abnormal situations downgrading the flight safety in the current movement context.

According to other advantageous aspects of the invention, the management method comprises one or more of the following features, considered alone or according to all technically possible combinations:

the piloting of the aircraft comprises one or more operational tasks, each operational task being done by the pilot of the aircraft by implementing one or more operational capacities of the aircraft;

the method further comprising a step for determining an availability state of each operational task based on the availability states of only the operational capacities used to carry out that task;

each operational task is chosen from among the group consisting of: piloting of the aircraft during flight, localization of the aircraft, guiding of the aircraft, communication of data between the aircraft and the ground, and observation of the environment surrounding the aircraft;

each operational task corresponds to a symbol comprising at least one characteristic determining the availability state of the corresponding operational task, and the characteristics of the different symbols corresponding to a same availability state are identical;

the communication step further comprising the display of the symbols corresponding to at least some operational tasks.

each operational capacity is associated with a symbol having at least one characteristic determining the availability state of the corresponding operational capacity, and the characteristics of the different symbols corresponding to a same availability state being identical;

the communication step further comprising the display of the symbols corresponding to at least some operational capacities.

each symbol corresponding to an operational task is displayed matching the symbols corresponding to the operational capacities used to carry out that operational task;

the aircraft comprises a mission formed by a sequence of operational tasks, at least one system of the aircraft corresponding to a manager for the mission able to provide a list of operational capacities required to perform each operational task of the mission;

the method further comprises a step for determining a feasibility state of the mission based on the list of required operational capacities and the availability states of those capacities, the feasibility state of the mission being chosen from among the group consisting of: a normal state, a recoverable state and an irrecoverable state;

the communication step further comprising the filtering of the displayed symbols according to at least one filter comprising a display criterion chosen from among the group consisting of:

displaying symbols based on availability states of the corresponding operational capacities; and displaying symbols based on movement contacts according to which the corresponding operational capacities are used.

displaying symbols based on operational capacities required to perform each operational task of the mission;

the method further comprises, for at least one operational capacity having a downgraded availability state, a step for determining a minimum effort corresponding to actions necessary by the pilot and/or a system to recover that operational capacity, the number of said actions being minimal;

each operational capacity is chosen from among the group consisting of: propulsion of the aircraft, control of the speed of the aircraft, control of the altitude of the aircraft, control of flight parameters of the aircraft, monitoring of icing conditions, control of aircraft approach categories, performance of required navigation, performance of localization with vertical guiding, vertical navigation, landing system with instruments, radio altimetric mode, reduced minimum vertical separation, minimum specification of the navigation performance, communication via text messages with the ground or other aircraft, communication via satellites, communication via high-frequency waves, communication via very high-frequency waves, monitoring of the relief, monitoring of air traffic, monitoring of weather conditions, monitoring and actuation of various control surfaces of the aircraft, information for passengers, and control of the taxiing of the aircraft;

each movement context corresponds to a maintenance phase of the aircraft or a flight phase of the aircraft chosen from among the group consisting of: a takeoff phase, an ascent phase, a cruising phase, a decent phase and a landing phase;

the selection of one or more operational capacities based on the current movement context of the aircraft comprises selecting one or more operational capacities used by the pilot in the current movement context of the aircraft.

each availability state of each operational capacity is determined based solely on the operating states of only the systems implementing that operational capacity and based on the availability states of the operational capacities on which that operational capacity depends.

The invention also relates to a computer program product including software instructions which, when implemented by computer equipment, carry out a method as defined above.

The invention also relates to a system for pilot decision aid for piloting an aircraft, the aircraft including a set of systems implementing operational capacities of the aircraft, each system being associated with a plurality of operating parameters defining its behavior, at least one system, called monitoring system, making it possible to determine operating state of each other system;

the aircraft moving in different movement contexts and being piloted using operational capacities selected by the pilot based on a current movement context of the aircraft;

each current movement context being defined by the systems used at the current moment to pilot the aircraft, by their operating parameters and by conditions outside the aircraft;

the decision aid system being able to:

acquire operating states of systems other than the monitoring system, the operating states being determined by the monitoring system, each operating state being chosen from among a normal state and a faulty state;

determine an availability state of each operational capacity, based on the operating states of only the systems of the aircraft implementing that operational capacity, each availability state being chosen from among the group consisting of: a normal state, a downgraded state, an impacted state and a lost state;

select one or more operational capacities based on the current movement context of the aircraft;

communicate the availability state of each selected operational capacity to the pilot.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION OF THE INVENTION

A pilot decision aid system for piloting an aircraft refers to a system to aid with the piloting of an aircraft, and in particular the knowledge and mastery of the capacities of an aircraft with the aim of ensuring safe piloting thereof.

Analogously, a pilot decision aid method for piloting an aircraft refers to a method to aid with the piloting of an aircraft, and in particular the knowledge and mastery of the capacities of an aircraft with the aim of ensuring safe piloting thereof.

Figure 1:
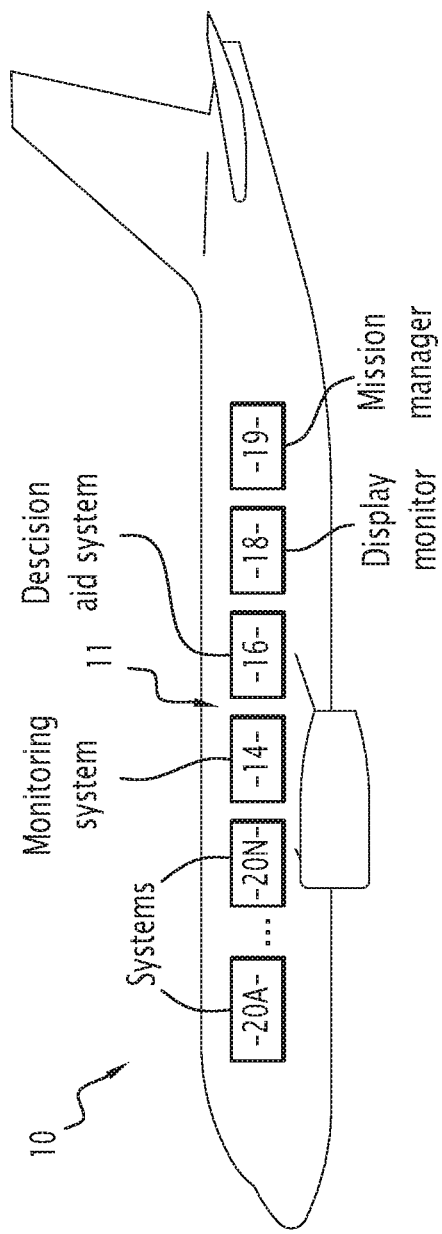
FIG. 1 is a diagrammatic view of an aircraft in particular including a monitoring system, a display monitor and a pilot decision aid system for piloting of an aircraft according to the invention.

In the example embodiment of FIG. 1, the aircraft 10 is for example an airplane able to be piloted by at least one pilot.

Alternatively, the aircraft 10 is a helicopter, or a drone piloted remotely by a pilot.

In a known manner, the operation of the aircraft 10 comprises a maintenance phase piloted by the or each maintenance operator, and a flight phase piloted by the or each pilot. Each flight phase is in particular chosen from among the group consisting of: a takeoff phase, an ascent phase, a cruising phase, a decent phase and a landing phase.

Any operation of the aircraft 10 having a defined purpose constitutes a mission M of the aircraft 10. Thus, for example, when the aircraft 10 is an airliner, one of its possible missions M is to transport passengers from one city to another. In this example, the mission M is defined by the corresponding airline.

The aircraft 10 is able to move during its mission M under the influence of outside conditions. These outside conditions for example comprise weather conditions or air traffic in the area around the aircraft 10.

The aircraft 10 includes a set of systems 11 making it possible to operate the aircraft 10.

"System" refers to a device that is at least partially electronic or a combination of such devices, onboard the aircraft 10 and able to carry out one or several services making it possible to operate the aircraft 10.

Examples of such systems in particular include a flight management system (FMS) or a traffic alert and collision avoidance system (TCAS) having combinations of different mechanical and electronic devices, or landing gear or any type of slats and flaps having different combinations of mechanical devices.

Each system of the set of systems 11 is able to operate in a plurality of configurations. In each configuration, a system is able to carry out a service determined by that configuration. The configuration of a system at a given moment is hereinafter referred to as the "current configuration" of that system.

Each system of the set of systems 11 is associated with a plurality of operating parameters characterizing its current configuration. Each operating parameter is for example able to assume a numerical value to characterize the current configuration of the corresponding system.

Thus, the operating parameters have different numerical values for different configurations of the corresponding system.

For example, an operating parameter associated with a flap corresponds to different configurations of that flap, such as the open flap or retracted flap. This operating parameter is for example able to assume a numerical value corresponding to the opening angle of that flap to characterize its current configuration.

The set of systems 11 used by the pilot to operate the aircraft 10 at a given moment, the current configurations of these systems at that moment and the current outside conditions of the aircraft 10 at that moment form a movement context of the aircraft 10. The aircraft 10 is thus able to move during its mission in different movement contexts corresponding to different systems used by the pilot, different current configurations of the systems and/or different outside conditions.

Each movement context of the aircraft 10 for example corresponds to one of its operating phases, such as the maintenance phase or one of the flight phases.

Services implemented by at least some of the systems relative to a specific piloting purpose form an operational capacity $C_j$ of the aircraft 10. "Operational capacity" thus refers to a plurality of services provided by the aircraft 10, using the systems to accomplish a predetermined piloting aim. Each operational capacity $C_j$ is therefore implemented by one or several systems.

Additionally, at least one operational capacity $C_j$ is implemented by one or several functional chains, each functional chain comprising a combination of several systems implementing corresponding services in a predetermined order.

When one or several services forming an operational capacity $C_j$ are no longer available, for example following a malfunction of the system(s) corresponding to those services, the operational capacity $C_j$ is said to be lost.

The pilot of the aircraft 10 is able to recover a lost operational capacity $C_j$ when a predetermined reconfiguration procedure exists making it possible to associate new services with that operational capacity $C_j$ to achieve the same piloting aim.

Each reconfiguration procedure for an operational capacity $C_j$ for example contains a plurality of actions predetermined by the pilot on systems or on their configuration making it possible to reach such a combination.

Each operational capacity $C_j$ is chosen from the group including:

propulsion of the aircraft 10, also known as "Power Sources";

control of the speed of the aircraft 10, also known as "Speed Management";

control of the altitude of the aircraft 10, also known as "Alt Management";

control of the flight parameters of the aircraft 10, also known as "Flight Control";

monitoring of Icing Conditions;

control of approach categories of the aircraft 10, such as CAT2 or CAT3 DUAL known in themselves;

Required Navigation Performance (RNP);

Localizer Performance with Vertical Guidance (LPV);
Vertical Navigation (VNAV);
Instrument Landing (IL);
radar altimetric mode, also called RAD ALT Mode;
Reduced Vertical Separation Minima (RVSM);
minimum navigation performance specifications (MNPS);
communication with the ground or other aircraft via text messages (Datalink);
Satellite Communication (SatCom);
communication via high-frequency (HF) waves;
communication via very high-frequency (VHF) waves;
monitoring of the relief;
monitoring of air traffic;
monitoring of weather conditions;
monitoring and actuation of different control surfaces of the aircraft 10;
passenger information; and
control of the taxiing of the aircraft 10.

The operational capacity $C_j$ of the aircraft 10 make it possible to perform operational tasks $T_i$ that can be done by the pilot to accomplish the mission M of the aircraft 10. "Operational task" thus refers to a set of commands that the pilot is able to execute directly on systems or indirectly via the systems to carry out the mission M.

When one or several operational capacity $C_j$ implementing an operational task $T_i$ are lost, the operational task $T_i$ is said to be lost.

The pilot of the aircraft 10 is able to recover a lost operational task $T_i$ when a predetermined reconfiguration procedure exists making it possible to associate new operational capacity $C_j$ to carry out that operational task $T_i$ and/or when it is possible to recover the lost operational capacities $C_j$.

As in the preceding case, each reconfiguration procedure for an operational task Ti for example contains a plurality of actions predetermined by the pilot on systems or on their configuration making it possible to reach such a combination.

Each operational task $T_i$ is chosen from the group consisting of:
piloting of the aircraft 10 during flight comprising a set of commands able to be executed by the pilot to keep the aircraft 10 in flight, for example commands to actuate the control stick or gas levers;
localization of the aircraft 10 comprising a set of commands able to be executed by the pilot to localize the aircraft 10 in space;
guidance of the aircraft 10 comprising a set of commands able to be executed by the pilot to guide the aircraft 10 along a predetermined route;
communication of data between the aircraft 10 and the ground consisting of the communication of the aircraft 10 with air-traffic control comprising a set of commands executable by the pilot to communicate with the air traffic control, for example via radio communication means;
communication of data between the aircraft 10 and the ground consisting of the commercial communication of the aircraft 10 comprising a set of commands executable by the pilot to communicate with the airline or any other structure defining the mission M of the aircraft 10; and
observation of the environment surrounding the aircraft 10 comprising a set of commands able to be executed by the pilot in particular to avoid collisions in the air or with the ground.

The set of systems 11 includes a system, called monitoring system and designated by reference 14, a system, called decision aid system and designated by reference 16, a system made in the form of a display monitor and designated by reference 18, a system made in the form of a mission manager and designated by reference 19, and other systems 20A to 20N. Only the systems 14, 16, 18 and 19 will be described in more detail later.

The monitoring system 14 is able to monitor the operation of the other systems 20A to 20N.

In particular, during the operation of the aircraft 10, the monitoring system 14 is able to assign each other system 20A to 20N the normal or faulty operating state to characterize the availability of that system 20A to 20N to carry out corresponding services.

To that end, the monitoring system 14 is connected to the other systems 20A to 20N and able to receive and analyze the operating parameters of those systems 20A to 20N to determine their operating state.

The operating state of a system is the normal state when the system is able to carry out all of the mandatory services for which it is designed.

The operating state of a system is the faulty state when the system is not able to carry out at least some of the mandatory services for which it is designed.

The monitoring system 14 is for example a system of the FWS (Flight Warning System) type known in itself in the state of the art.

The decision aid system 16 is connected to the monitoring system 14 to receive the operating states of the systems 20A to 20N determined by the monitoring system 14, and the display monitor 18 to communicate information to the pilot from a decision aid method described later.

The decision aid system 16 is able to carry out the decision aid method.

In particular, the decision aid system 16 is able to determine an availability state for each operational capacity $C_j$ and each operational task $T_i$. Each availability state is chosen from among the group consisting of: a normal state, a downgraded state, an impacted state and a lost state.

The availability state of an operational capacity $C_j$ or an operational task $T_i$ is the normal state when the operational capacity $C_j$ or the operational task $T_i$ is not lost.

The availability state of an operational capacity $C_j$ or an operational task $T_i$ provided to be used during the mission M is the downgraded state when the operational capacity $C_j$ or the operational task $T_i$ is lost, but there is a reconfiguration procedure allowing it to be recovered. In particular, an operational task $T_i$ is lost when at least one operational capacity $C_j$ making it possible to carry out that operational task $T_i$ is lost.

The availability state of an operational capacity $C_j$ or an operational task $T_i$ is the lost state when the operational capacity $C_j$ or the operational task $T_i$ is lost and when there is no reconfiguration procedure allowing it to be recovered.

The availability state of an operational capacity $C_j$ or an operational task $T_i$ provided to be used during the mission M is the downgraded state when the operational capacity $C_j$ or the operational task $T_i$ is lost, but there is a reconfiguration procedure allowing it to be recovered.

The decision aid system 16 is further able to determine a feasibility state of the mission M. Each feasibility state of the mission M is chosen from among the group consisting of: the normal state, the recoverable state and the irrecoverable state.

The feasibility state of the mission M is the normal state when each operational capacity $C_j$ required to carry out the mission M has the normal state.

The feasibility state of the mission M is equal to the downgraded state when an operational capacity $C_j$ required to carry out the mission M has the downgraded state.

The feasibility state of the mission M is equal to the faulty state when at least one operational capacity $C_j$ required to carry out the mission M has the lost state.

Figure 2:
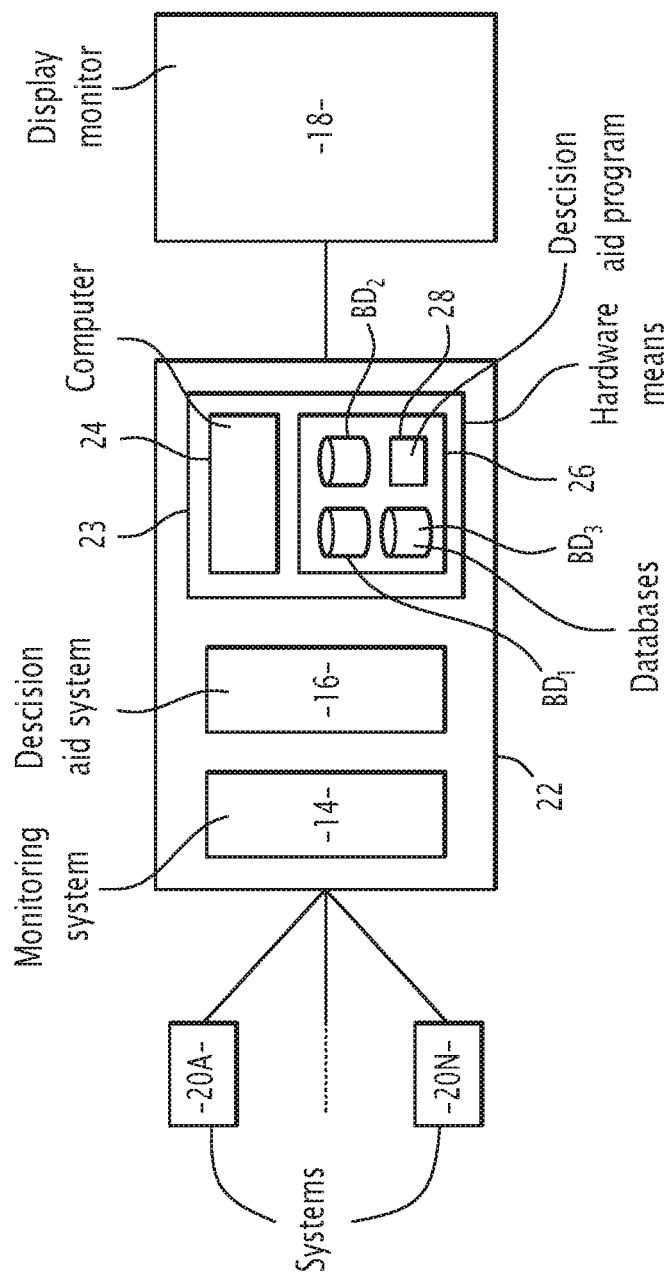
FIGS. 2 and 3 are diagrammatic views of the different example embodiments of monitoring and decision aid systems of FIG. 1.

In the example embodiment of FIG. 2, the monitoring system 14 and the decision aid system 16 are made in the form of a single monitoring module 22 further including hardware means 23 configured to carry out the operation of the monitoring system 14 and the decision aid system 16.

The hardware means 23 in particular comprise a computer 24 and a memory 26 able to store a decision aid program 28, a first database $BD_1$, a second database $BD_2$ and a third database $BD_3$.

The decision aid program 28 is able to carry out the steps of the decision aid method using the computer 24.

The first database $BD_1$ contains a list of the set of operational capacities $C_j$, and for each operational capacity $C_j$, a list of systems 20A to 20N implementing this operational capacity $C_j$.

Additionally, for at least one operational capacity $C_j$, the database $BD_1$ contains a list of operational capacity $C_j$ on which this operational capacity $C_j$ depends.

The second database $BD_2$ contains a list of the set of operational tasks $T_i$, and for each operational task $T_i$, a list of operational capacity $C_j$ implementing this operational task $T_i$.

The third database $BD_3$ contains a list of the set of operational capacities $C_j$ and operational tasks $T_i$, and for each operational capacity $C_j$ or operational task $T_i$, one or several reconfiguration procedures allowing the pilot to recover this operational capacity $C_j$ or this operational task $T_i$ when it has the downgraded state.

Figure 3:
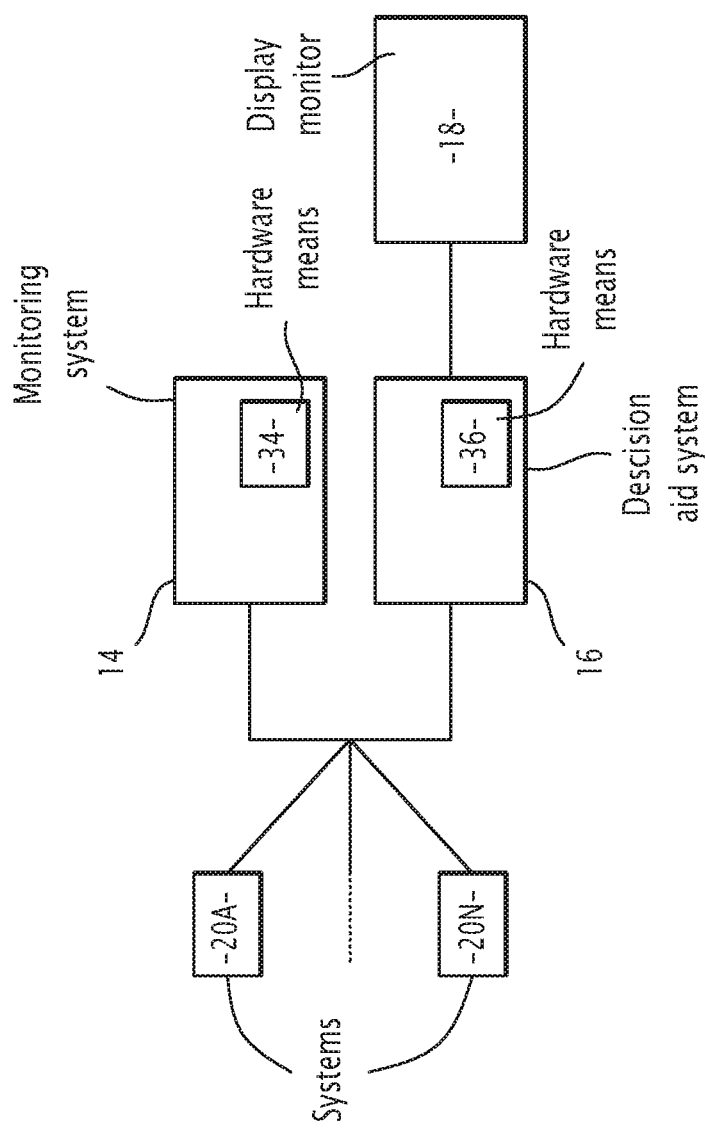

In the example embodiment of FIG. 3, the monitoring system 14 and the decision aid system 16 are made in the form of separate modules including separate hardware means that are respectively designated by references 34 and 36.

The hardware means 34 and 36 of FIG. 3 are analogous to the hardware means 23 of FIG. 2. In particular, the memory of the hardware means 36 of the decision aid system 16 is able to store the first $B_1$, second $B_2$ and third $BD_3$ databases previously described.

The mission manager 19 is a computer able to store and analyze a set of information relative to the mission M of the aircraft 10. In particular, the mission manager 19 makes it possible to store a list of operational capacity $C_j$ required to carry out the mission M and the feasibility state of the mission M determined by the decision aid system 16.

Figure 4:
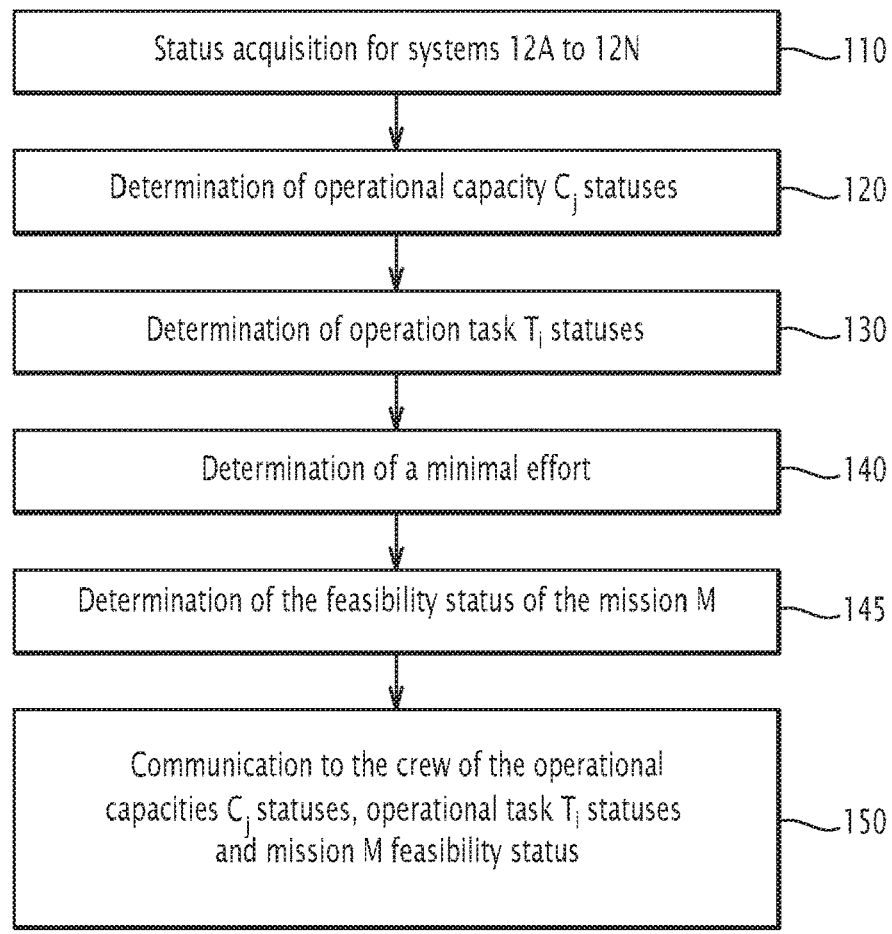
FIG. 4 is a flowchart of a pilot decision aid method for the piloting of the aircraft, implemented by the decision aid system of FIG. 1.

The decision aid method will now be described in reference to FIG. 4, illustrating a flowchart of its steps.

Initially, the monitoring system 14 determines the operating states of the other systems 20A to 20N.

In particular, each determined operating state corresponds either to the normal state or to the faulty state. This then makes it possible not only to detect faults in the systems 20A to 20N, but also to detect systems 20A to 20N operating normally.

During step 110, the decision aid system 16 acquires the operating states determined by the monitoring system 14.

During a following step 120, the decision aid system 16 determines an availability state of each operational capacity $C_j$, based on the operating states of only the systems 20A to 20N carrying out that operational capacity $C_j$ and potentially based on the availability states of each operational capacity $C_j$ on which that operational capacity $C_j$ depends.

To that end, for each operational capacity $C_j$, the decision aid system 16 determines the systems 20A to 20N carrying out that operational capacity $C_j$, and potentially all of the operational capacity $C_j$ on which that operational capacity $C_j$ depends, using the first database $BD_1$.

When the determined operating state of each system 20A to 20N, and potentially the determined availability state of each operational capacity $C_j$ is equal to the normal state, the decision aid system 16 determines that the availability state of the operational capacity $C_j$ in question is equal to the normal state.

When the considered operational capacity $C_j$ is provided to be used during the mission M and when the operating state of at least one determined system 20A to 20N is faulty and/or the availability state of at least one determined operational capacity $C_j$ is equal to the downgraded state or the lost state, but there is a reconfiguration procedure making it possible to recover the operational capacity $C_j$ in question, the decision aid system 16 then determines that the availability state of the operational capacity $C_j$ in question is equal to the downgraded state.

When the operating state of at least one determined system 20A to 20N is equal to the faulty state and/or the availability state of at least one determined operational capacity $C_j$ is equal to the downgraded state or the lost state, and there is no reconfiguration procedure making it possible to recover the operational capacity $C_j$ in question, the decision aid system 16 then determines that the availability state of the operational capacity $C_j$ in question is the lost state.

When the considered operational capacity $C_j$ is not provided to be used during the mission M and when the operating state of at least one determined system 20A to 20N is faulty and/or the availability state of at least one determined operational capacity $C_j$ is equal to the downgraded state or the lost state, but there is a reconfiguration procedure making it possible to recover the operational capacity $C_j$ in question, the decision aid system 16 then determines that the availability state of the operational capacity $C_j$ in question is equal to the impacted state.

Then, the decision aid system determines the current movement context of the aircraft 10.

Figure 5:
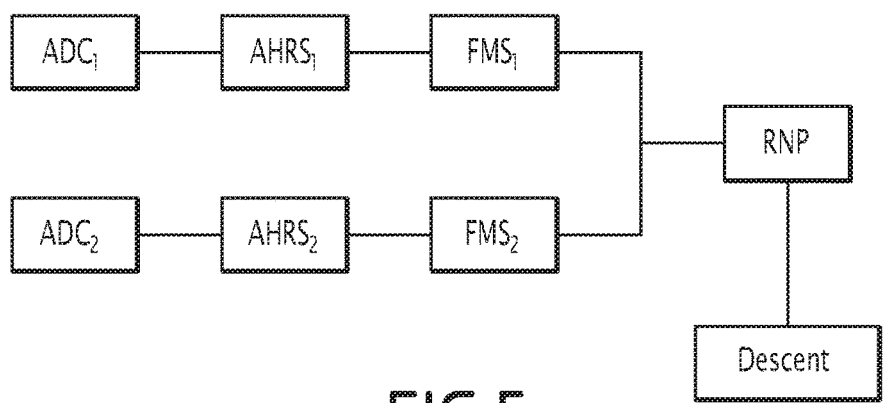
FIG. 5 is a diagrammatic view illustrating the operation of a step of the decision aid method of FIG. 4.

An example illustrating step 120 of the decision aid method is shown in FIG. 5.

According to this figure, the RNP operational capacity is implemented by two redundant chains of systems, each chain being made up of an Air Data Computer (ADC), an Altitude and Heading Reference System (AHRS) and a flight management system (FMS). The current movement context is the descent phase.

When the determined operating state of each of the ADC, AHRS and FMS systems of each of the redundant chains is normal, the decision aid system 16 determines that the availability state of the RNP operational capacity $C_j$ is equal to the normal state.

When the operating state of one of the ADC and FMS systems of the second chain is faulty, the decision aid system 16 then determines that the availability state of the RNP operational capacity is downgraded, since it can be recovered by using only the first redundant chain.

When additionally, the operating state of the AHRS system of the first redundant chain is faulty, the decision aid system 16 then determines that the availability state of the RNP operational capacity is lost, since no redundant chain is available.

During the following step 130, the decision aid system 16 determines an availability state of each operational task $T_i$, based on the availability states of only the operational capacity $C_j$ necessary to carry out that operational task $T_i$ for the mission M.

To that end, for each operational task $T_i$, the decision aid system 16 determines the set of operational capacity $C_j$ implementing this operational task, using the second database $BD_2$.

When the availability state of each determined operational capacity $C_j$ is the normal state, the decision aid system 16 determines that the availability state of the operational task $T_i$ in question is equal to the normal state.

When the availability state of at least one of the operational capacities $C_j$ provided to be used during the mission is the downgraded state or the lost state, but there is a reconfiguration procedure making it possible to recover the operational task $T_i$ in question, the decision aid system 16 then determines that the availability state of the operational task $T_i$ in question is equal to the downgraded state.

When the availability state of at least one of the operational capacities $C_j$ not provided to be used during the mission is the downgraded state or the lost state, but there is a reconfiguration procedure making it possible to recover the operational task $T_i$ in question, the decision aid system 16 then determines that the availability state of the operational task $T_i$ in question is equal to the impacted state.

When the availability state of at least one of the determined operational capacity $C_j$ is lost, and there is no reconfiguration procedure making it possible to recover the operational task $T_i$ in question, the decision aid system 16 then determines that the availability state of the operational task $T_i$ in question is equal to the lost state.

Figure 6:
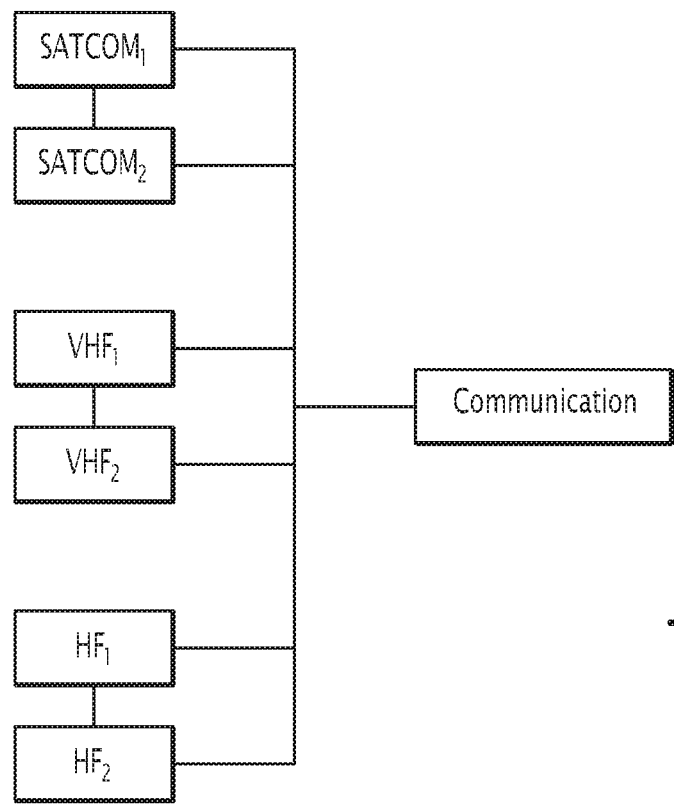
FIG. 6 is a diagrammatic view illustrating the operation of another step of the decision aid method of FIG. 4.

An example illustrating step 130 of the decision aid method is shown in FIG. 6.

According to this figure, the communication operational task of the aircraft with air traffic control is implemented by three redundant chains. A first redundant chain is made up of two redundant SatCom operational capacities, a second redundant chain is made up of two redundant VHF operational capacities, and a third redundant chain is made up of two redundant HF operational capacities.

When the availability state of each of the SatCom, VHF and HF capacities of each of the chains is equal to the normal state, the decision aid system 16 then determines that the availability state of the communication operational task is equal to the normal state.

When the availability state of one of the SatCom redundant capacities is equal to the downgraded state or the lost state and the SatCom capacity is provided to be used for the mission, the decision aid system 16 then determines that the availability state of the communication operational task is equal to the downgraded state.

When the availability state of one of the SatCom redundant capacities is equal to the downgraded state or the lost state and the SatCom capacity is not provided to be used for the mission, the decision aid system 16 then determines that the availability state of the communication operational task is equal to the impacted state.

When the availability state of all of the redundant operational SatCom, VHF and HF capacities is lost, the decision aid system 16 then determines that the availability state of the communication operational task is equal to the lost state.

During the following step 140, for each operational capacity $C_j$ having an availability state equal to the downgraded state, the decision aid system 16 determines the minimum effort necessary to recover this operational capacity $C_j$.

This step 140 is advantageously done only for the operational capacities $C_j$ provided to be used during the mission.

To that end, the decision aid system 16 runs through the third database $BD_3$ and determines the set of reconfiguration procedures corresponding to the operational capacity $C_j$ in question.

Then, according to one example embodiment, the decision aid system 16 calculates the number of actions in each of the determined reconfiguration procedures and proposes the procedure having the smallest number of actions.

According to another example embodiment, the decision aid system 16 calculates the time necessary to carry out each of the determined reconfiguration procedures and proposes the procedure having the shortest performance time.

According to still another example embodiment, the decision aid system 16 calculates the number of actions in each of the determined reconfiguration procedures and the time necessary to carry out each of these procedures.

Then, the decision aid system 16 associates a weight with each of the obtained sums based on the criticality associated with each procedure and adds up these weights in a weighted manner. Then, the decision aid system 16 compares the sum obtained to the time the pilot has to perform this action and informs him what critical procedures can and cannot be done based on the remaining time.

In the three aforementioned example embodiments, the minimum effort consists of the actions by the pilot defined by the reconfiguration procedures selected by the decision aid system 16.

Additionally, during the same step, the decision aid system 16 determines the minimum effort necessary to recover the possibility of performing each operational task $T_i$ having the downgraded state, similarly to that previously described.

During the following step 145, the decision aid system 16 determines the feasibility state of the mission M.

To that end, the decision aid system 16 recovers the list of operational capacity $C_j$ required to perform the mission M from the mission manager 19.

The decision aid system 16 then associates the availability state determined during step 120 with each required operational capacity $C_j$.

The decision aid system 16 determines the feasibility state of the mission M as normal when each operational capacity $C_j$ required to carry out the mission M has the normal state.

The decision aid system 16 determines the feasibility state of the mission M as recoverable when each operational capacity $C_j$ required to carry out the mission M has the downgraded state or the normal state.

The decision aid system 16 determines the feasibility state of the mission M as irrecoverable when at least one operational capacity $C_j$ required to carry out the mission M has the lost state.

During the following step 150, the decision aid system 16 communicates, to the pilot, the availability state of each operational capacity $C_j$ used to pilot the aircraft 10 based on its current movement context.

Additionally, the decision aid system 16 communicates, to the pilot, the availability state of each operational capacity $C_j$ used to pilot the aircraft 10 based on a movement context other than the current movement context. This other movement context is for example that which follows the current movement context.

For each operational capacity $C_j$ having the downgraded state, the impacted state or the lost state, the decision aid system 16 further provides the pilot with a list of systems 20A to 20N having caused the corresponding malfunctions.

For each operational capacity $C_j$ having the downgraded state, the impacted state or the lost state, the decision aid system 16 further provides the pilot with the reconfiguration procedure corresponding to the minimal effort making it possible to recover this operational capacity $C_j$.

The decision aid system 16 further provides the pilot with the availability state of each operational task $T_i$ and the feasibility state of the mission M.

Additionally, for each operational task $T_i$ having the downgraded state, the decision aid system 16 further provides the pilot with the reconfiguration procedure corresponding to the minimal effort making it possible to recover this operational task $T_i$.

The aforementioned information is communicated to the pilot via the display monitor 18. Examples presentations of this information on the display monitor 18 are illustrated in FIGS. 7 to 10.

In particular, to display the aforementioned information, the decision aid system 16 associates a symbol with each operational capacity $C_j$ to be communicated to the pilot. Such a symbol for example corresponds to an abbreviation of the name of the corresponding operational capacity $C_j$ recognized by the pilot.

In FIGS. 7 to 10, the decision aid system 16 associates the "RNP", "VNAV", "LPV" and "ILS" symbols with the RNP, VNAV, LPV and ILS operational capacities previously described, respectively.

Each symbol has at least one characteristic determining the availability state of the corresponding operational capacity $C_j$. The characteristics of the different symbols corresponding to a same availability state are identical.

Thus, for example, the characteristic of all of the symbols associated with the operational capacity $C_j$ having the normal state is the green color of these symbols.

The characteristic of all of the symbols associated with the operational capacity $C_j$ having the downgraded state is the amber color of these symbols.

The characteristic of all of the symbols associated with the operational capacity $C_j$ having the lost state is the red color of these symbols.

In the example of FIGS. 7 to 10, the symbols with no underline corresponds to the normal state of the corresponding operational capacities $C_j$, the symbols with a broken underline corresponds of the downgraded state of the corresponding operational capacities $C_j$, and the symbols with a continuous underline correspond to the lost state of the corresponding operational capacities.

Figure 7:
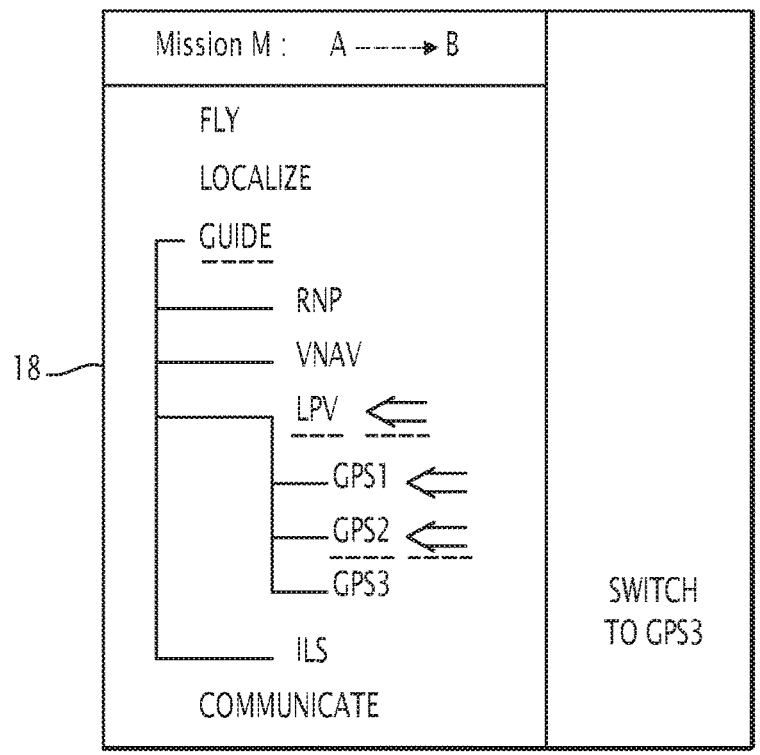
FIGS. 7 to 10 are diagrammatic views of the display monitor of FIG. 1 at the end of a step of the decision aid method of FIG. 4.

Thus, according to FIG. 7, the LPV operational capacity has the downgraded state. According to FIGS. 9 and 10, this LPV operational capacity has the lost state.

The symbol of each operational capacity $C_j$ whereof the availability state is equal to the downgraded state or the lost state is displayed matched with symbols corresponding to the systems 20A to 20N whose services form this operational capacity $C_j$.

This correspondence is for example displayed in the form of a tree structure, i.e., the symbols associated with the systems 20A to 20N whereof the services form the operational capacity $C_j$ in question, are displayed hierarchically relative to the symbol associated with this operational capacity $C_j$.

Each symbol associated with a system 20A to 20N has a characteristic determining the operating state of this system 20A to 20N.

Thus, for example, the characteristic of all of the symbols associated with the systems 20A to 20N having the normal operating state is the green color of these symbols.

The characteristic of all of the symbols associated with the systems 20A to 20N having the downgraded operating state is the amber color of these symbols.

In the example of FIGS. 7 to 10, the symbols "GPS1", "GPS2" and "GPS3" are associated with the GPS1, GPS2 and GPS3 systems whose services form the LPV operational capacity. In these figures, the symbols not underlined correspond to the normal operating state of the corresponding systems 20A to 20N, the symbols with a broken underline correspond to the faulty operating state of the corresponding systems 20A to 20N.

The symbols of the systems 20A to 20N and operational capacities used or provided as needing to be used for the mission in progress are indicated by arrows. The arrows have the same characteristics as the symbols indicated by these arrows.

In FIG. 7, the GPS1 and GPS2 systems are used depending on the movement context. The operating state of the GPS2 system is faulty. The symbol associated with this system is underlined by a broken line with the corresponding arrow.

The minimum effort necessary to recover an operational capacity $C_j$ having the availability state equal to the downgraded state is for example displayed in the form of a list of actions to be performed by the pilot depending on the reconfiguration procedure chosen during step 140.

In FIG. 7, the action to be performed by the pilot to recover the LPV operational capacity having the availability state equal to the downgraded state is to use the GPS3 system instead of the GPS2 system.

The decision aid system 16 allows the pilot to perform at least certain actions determined by the corresponding reconfiguration procedure directly on the display monitor 18.

Figure 8:
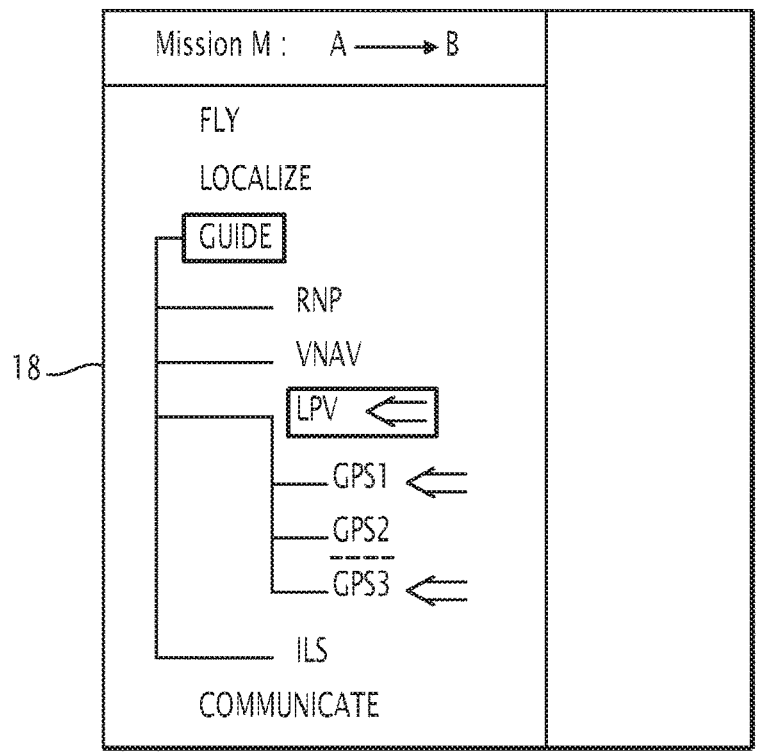

Thus, according to the example embodiment of FIG. 7, it is possible for the pilot to perform the proposed action based on the minimum effort by clicking on the GPS3 system. The result of this action is illustrated in FIG. 8. The services of the GPS1 and GPS3 systems having the normal operating state are henceforth used to form the LPV operational capacity. The LPV operational capacity is therefore recovered.

The symbol associated with a recovered operational capacity $C_j$ has a characteristic indicating the fact that this operational capacity $C_j$ has been recovered. This characteristic for example corresponds to the white color of the corresponding symbol.

In FIG. 8, the symbol corresponding to the LPV operational capacity is framed to indicate that this LPV operational capacity has been recovered.

Similarly to the operational capacities $C_j$, the decision aid system 16 associates each operational task $T_i$ with a symbol corresponding to a name of that operational task $T_i$ recognized by the pilot.

In FIGS. 7 to 10, the "FLY", "LOCALIZE", "GUIDE" and "COMMUNICATE" symbols respectively correspond to the operational tasks of flying, localizing, guiding and communication of the aircraft.

Similarly to the symbols associated with the operational capacities $C_j$, the symbols associated with the operational tasks $T_i$ have a characteristic determining the availability state of these operational tasks $T_i$. These characteristics are for example identical to the corresponding characteristics of the symbols associated with the operational capacities $C_j$.

The symbol of each operational task $T_i$ whereof the availability state is equal to the downgraded state or the lost state is displayed matched with symbols corresponding to the operational capacity $C_j$ that the pilot may use to perform this operational task $T_i$.

This correspondence is for example displayed in the form of a tree structure, i.e., the set of operational capacity $C_j$ carrying out a given operational task $T_i$ are displayed hierarchically relative to the symbol associated with this operational task $T_i$.

The tree structure formed by the set of symbols corresponding to the systems 20A to 20N, the operational capacity $C_j$ and the operational tasks $T_i$ is therefore made up of three levels: a first level of systems 20A to 20N, a second level of operational capacity $C_j$ and a third level of operational tasks $T_i$.

In FIG. 7, the "GUIDE" symbol associated with the operational guiding task is underlined with a broken line to indicate its downgraded status.

In FIG. 8, the "GUIDE" symbol associated with the operational guiding task is framed to indicate that it was recovered by carrying out the reconfiguration procedure proposed in FIG. 7.

Figure 9:
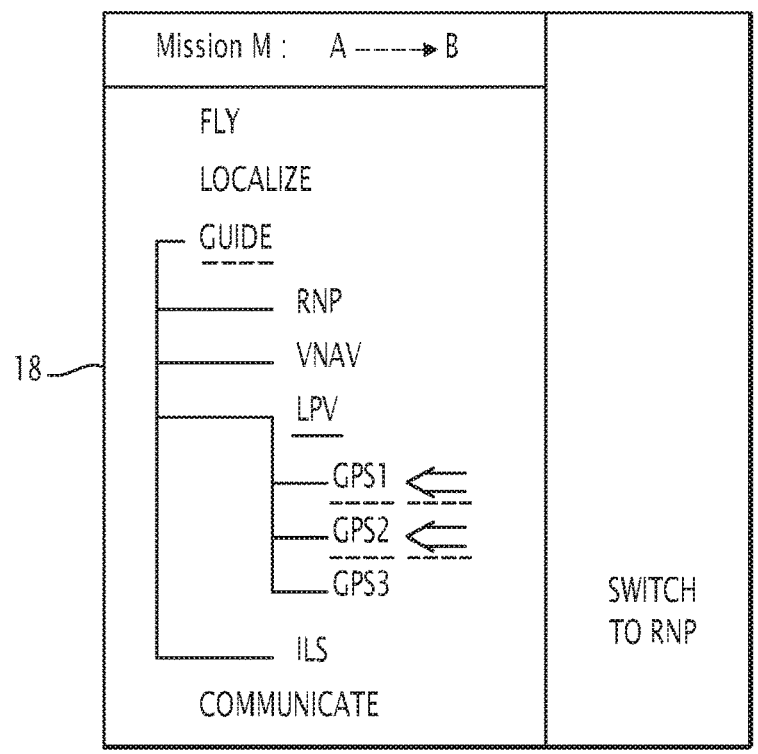

In FIG. 9, the "GUIDE" symbol associated with the operational guiding task is underlined with a broken line to indicate its downgraded status. In the same figure, the action consisting of using the RNP operational capacity instead of the LPV operational capacity in order to recover the guiding operational task.

Figure 10:
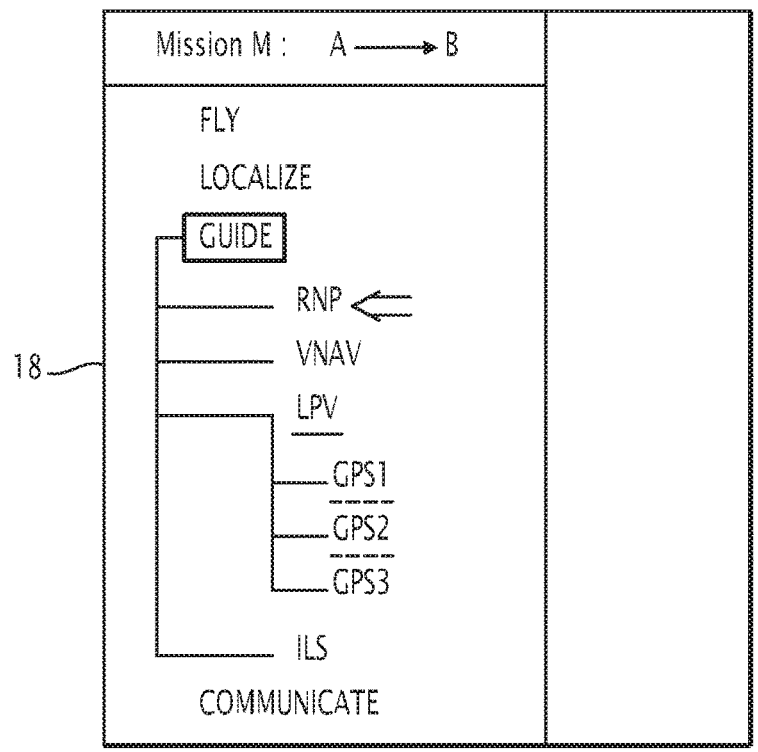

In FIG. 10, the "GUIDE" symbol associated with the operational guiding task is framed to indicate that it was recovered by carrying out the reconfiguration procedure in FIG. 8.

Lastly, the feasibility state of the mission M is displayed in a symbolic form. Thus, for example, when the feasibility state of the mission M is the normal state, a symbol representing the aircraft and its progression 10 is displayed in a form or color representing the normal state.

When the feasibility state of the mission M is the recoverable state, the symbol representing the aircraft and/or its progression is displayed in a predetermined specific form or color.

When the feasibility state of the mission M is the irrecoverable state, an X is displayed instead of the symbol representing the aircraft and/or its progression.

Thus, in FIGS. 7 and 9, the feasibility state of the mission M is equal to the recoverable state. In FIGS. 8 and 10, the feasibility state of the mission M is equal to the normal state.

Other examples of the depiction of information to be communicated during step 150 are also possible.

Thus, it is possible to use methods for filtering the symbols displayed on the monitor 18 according to at least one filter comprising a display criterion chosen from among the group consisting of:
displaying symbols based on availability states of the corresponding operational capacity $C_j$ or corresponding operational tasks $T_i$; and
displaying symbols based on movement contexts for example to display only symbols associated with the systems 20A to 20N and the operational capacity $C_j$ used depending on the current movement context.

It should further be noted that at least some steps of the decision aid method are optional. In this case, the information produced after these optional steps is not communicated to the pilot during step 150. In particular, step 130 for determining availability states of the operational tasks $T_i$, step 140 for determining a minimal effort and step 145 for determining the feasibility state of the mission M are optional.

One can then see that the present invention has a certain number of advantages.

The method according to the invention makes it possible to provide information to the pilot on the operating states of the systems 20A to 20N depending on the current movement context of the aircraft 10.

This makes it possible not only to warn the pilot of a malfunction having occurred in one or several systems 20A to 20N, but also to have an overview of the available systems 20A to 20N. Thus, the pilot has the option of quickly recovering an operational capacity $C_j$ or an operational task $T_i$ lost following this malfunction, by having this operational capacity $C_j$ or this operational task $T_i$ reconfigured with services provided by available systems 20A to 20N.

The method according to the invention further proposes calculating the minimum effort necessary to perform such a reconfiguration, which allows the pilot to decrease the time needed to manage abnormal situations.

Lastly, the communication of information on the operating states of the systems 20A to 20N and the states of the operational capacity $C_j$ is done based on the current evolution context, which allows a considerable decrease in the quantity of information communicated to the pilot all at once to increase the efficiency of its processing by the pilot.

The invention claimed is:

1. A method for pilot decision aid for piloting an aircraft, the aircraft including a set of systems implementing operational capacities of the aircraft, each system being associated with a plurality of operating parameters defining its behavior, at least one system, called monitoring system, able to receive and analyze the operating parameters of each other system to determine operating state of each other system;
the aircraft moving in different movement contexts and being piloted using operational capacities selected by a pilot based on a current movement context of the aircraft;
each current movement context being defined by the systems used at a current moment to pilot the aircraft, by their operating parameters and by conditions outside the aircraft, the outside conditions comprising weather conditions or air traffic in the area around the aircraft;
the method including the following steps:
acquiring operating states of systems other than the monitoring system, the operating states being determined by the monitoring system, each operating state being chosen from among a normal state and a faulty state;
determining an availability state of each operational capacity, based on the operating states of only the systems of the aircraft implementing that operational capacity, each availability state being chosen from among a group consisting of: a normal state, a downgraded state, an impacted state and a lost state;
selecting one or more operational capacities based on the current movement context of the aircraft; and
communicating the availability state of each selected operational capacity to the pilot.

2. The method according to claim 1, wherein the piloting of the aircraft comprises one or more operational tasks, each operational task being done by the pilot of the aircraft by implementing one or more operational capacities of the aircraft; and the method further comprising a step for determining an availability state of each operational task based on the availability states of only the operational capacities used to carry out that task.

3. The method according to claim 2, wherein each operational task is chosen from a group consisting of:
   piloting during flight of the aircraft;
   localization of the aircraft;
   guiding of the aircraft;
   communication of data between the aircraft and the ground; and
   observation of the environment surrounding the aircraft.

4. The method according to claim 2, wherein each operational task corresponds to a symbol comprising at least one characteristic determining the availability state of the corresponding operational task, and the characteristics of the different symbols corresponding to a same availability state are identical;
   the communication step further comprising the display of the symbols corresponding to at least some operational tasks.

5. The method according to claim 1, wherein each operational capacity is associated with a symbol having at least one characteristic determining the availability state of the corresponding operational capacity, and the characteristics of the different symbols corresponding to a same availability state being identical;
   the communication step further comprising the display of the symbols corresponding to at least some operational capacities.

6. The method according to claim 4, wherein each symbol corresponding to an operational task is displayed matching the symbols corresponding to the operational capacities used to carry out that operational task.

7. The method according to claim 2, wherein the aircraft comprises a mission formed by a sequence of operational tasks, at least one system of the aircraft corresponding to a manager for the mission able to provide a list of operational capacities required to perform each operational task of the mission.

8. The method according to claim 7, further comprising a step for determining a feasibility state of the mission based on the list of required operational capacities and the availability states of those capacities, the feasibility state of the mission being chosen from among the group consisting of: a normal state, a recoverable state and an irrecoverable state.

9. The method according to claim 7, wherein the communication step further comprising the filtering of the displayed symbols according to at least one filter comprising a display criterion chosen from among a group consisting of:
   displaying symbols based on availability states of the corresponding operational capacities;
   displaying symbols based on movement contexts according to which the corresponding operational capacities are used; and
   displaying symbols based on operational capacities required to perform each operational task of the mission.

10. The method according to claim 1, further comprising, for at least one operational capacity having a downgraded availability state, a step for determining a minimum effort corresponding to actions necessary by the pilot and/or a system to recover that operational capacity, the number of said actions being minimal.

11. The method according to claim 1, wherein each operational capacity is chosen from among a group consisting of:
propulsion of the aircraft;
speed management of the aircraft;
altitude management of the aircraft;
flight parameter management of the aircraft;
monitoring icing conditions;
aircraft approach category management;
required navigation performance;
localizer performance with vertical guidance;
vertical navigation;
instrument landing system;
radar altimetric mode;
reduced vertical separation minima;
minimum navigation performance specifications;
communication with the ground or other aircraft via text messages;
satellite communication;
communication via high-frequency waves;
communication via very high-frequency waves;
monitoring of relief;
monitoring of air traffic;
monitoring of weather conditions;
monitoring and actuation of different control surfaces of the aircraft;
passenger information; and
control of taxiing of the aircraft.

12. The method according to claim 1, wherein each movement context corresponds to a maintenance phase of the aircraft or a flight phase of the aircraft chosen from among the group consisting of: a takeoff phase, an ascent phase, a cruising phase, a decent phase and a landing phase.

13. The method according to claim 1, wherein the selection of one or more operational capacities based on the current movement context of the aircraft comprises selecting one or more operational capacities used by the pilot in the current movement context of the aircraft.

14. A non-transitory computer program product including software instructions which, when implemented by a computer, implement the method according to claim 1.

15. A decision aid system for pilot decision aid for piloting an aircraft, the aircraft including a set of systems implementing operational capacities of the aircraft, each system being associated with a plurality of operating parameters defining its behavior, at least one system, called monitoring system, making it possible to determine operating state of each other system;
   the aircraft moving in different movement contexts and being piloted using operational capacities selected by a pilot based on a current movement context of the aircraft;
   each current movement context being defined by the systems used at a current moment to pilot the aircraft, by their operating parameters and by conditions outside the aircraft;
   the decision aid system comprising:
      an acquisition module for acquiring operating states of systems other than the monitoring system, the operating states being determined by the monitoring system, each operating state being chosen from among a normal state and a faulty state;
      a determination module for determining an availability state of each operational capacity, based on the operating states of only the systems of the aircraft implementing that operational capacity, each availability state being chosen from among a group consisting of: a normal state, a downgraded state, an impacted state and a lost state;

a selection module for selecting one or more operational capacities based on the current movement context of the aircraft; and a communication module for communicating the availability state of each selected operational capacity to the pilot.

\* \* \* \* \*